United States Patent [19]

Ushida

[11] Patent Number: 5,539,541
[45] Date of Patent: Jul. 23, 1996

[54] IMAGE PROCESSING APPARATUS INCLUDING NOISE ELIMINATION CIRCUITS

[75] Inventor: Katsutoshi Ushida, Machida, Japan

[73] Assignee: Canon Kabushiki Kaisha, Tokyo, Japan

[21] Appl. No.: 334,352

[22] Filed: Nov. 3, 1994

Related U.S. Application Data

[63] Continuation of Ser. No. 857,508, Mar. 25, 1992, abandoned.

[30] Foreign Application Priority Data

Mar. 27, 1991 [JP] Japan ................................. 3-087634

[51] Int. Cl.⁶ ................................. H04N 1/409; H04N 1/58
[52] U.S. Cl. ........................ 358/530; 358/532; 358/448; 358/462
[58] Field of Search .......................... 358/447, 448, 358/462, 465, 466, 455, 456, 458, 530, 532, 534; 382/50, 54, 176, 266

[56] References Cited

U.S. PATENT DOCUMENTS

| 5,023,919 | 6/1991 | Wataya. | |
| 5,060,082 | 10/1991 | Matsumoto et al. | 358/447 |
| 5,339,365 | 8/1994 | Kawai | 382/54 |

FOREIGN PATENT DOCUMENTS

| 716536 | 4/1987 | European Pat. Off. | H04N 1/40 |
| 415648 | 3/1991 | European Pat. Off. | |
| 2151104 | 7/1985 | United Kingdom | H04N 1/40 |

*Primary Examiner*—Scott A. Rogers
*Attorney, Agent, or Firm*—Fitzpatrick, Cella, Harper & Scinto

[57] ABSTRACT

An image processor in which an input device inputs image data. Image data of a subject pixel is smoothed in accordance with the image data of the subject pixel and peripheral pixels of the subject pixel. A judgment is made relative to the level of the image data of the image data of the subject pixel and the peripheral pixels. The image processor selectively outputs one of the smoothed image data and the image data of the subject pixel, based on the judgment.

10 Claims, 9 Drawing Sheets

FIG.11C SMOOTHING FILTER (PERIPHERAL 4-PIXEL MEAN)

$f_2 = (A+B+C+D)/4$

FIG.11B EDGE EMPHASIS FILTER (LAPLACIAN FILTER)

\* : DON'T CARE

FIG.11D

○ : LUMINANCE LEVEL JUDGMENT PIXEL

FIG.12

IMAGE PROCESSING APPARATUS INCLUDING NOISE ELIMINATION CIRCUITS

This application is a continuation of application Ser. No. 07/857,508 filed Mar. 25, 1992, now abandoned.

BACKGROUND OF THE INVENTION

1. Field of the Invention

The present invention relates to an image processing apparatus capable of eliminating noise in image signals.

2. Related Background Art

An image processing apparatus is known which processes image data read by a line sensor made up of charge coupled devices (CCDs) or contact sensor (CS), with the processed image data being printed by a printer. Multi-value signals of an image read by a line sensor are converted into density signals which are binarized by a pseudo half-tone process using an error distribution method, a dither method, or the like, and are printed by a printer.

Figure 2:
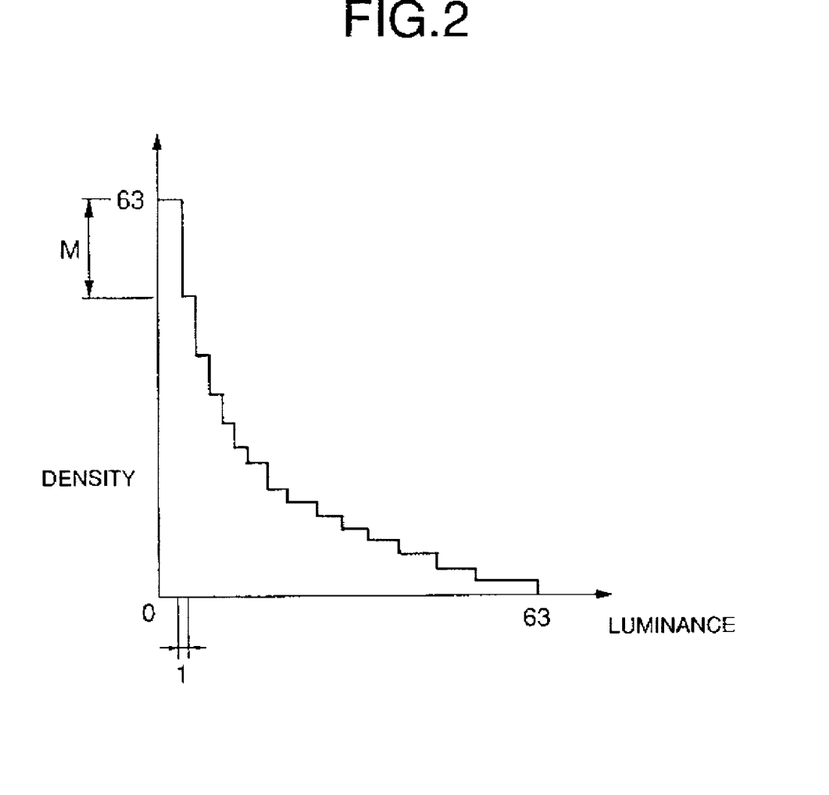
FIG. 2 is a graph showing the relation between density and luminance used for luminance-density conversion of an image read by a line sensor.

Such a conventional apparatus uses a non-linear density-luminance conversion table which is not linear as shown in FIG. 2. Therefore, for example, a change in luminance level by one step at a low luminance level corresponds to M steps of the density level.

If noise is contained in a luminance signal read by a line sensor, the noise is emphasized at a low luminance level, i.e., at a high density level. Even one step of the luminance level may produce a conspicuous white or black line on an output image.

Smoothing filters, median filters and the like are known as a means for eliminating such noise. However, use of these filters eliminates noise on the one hand, and lowers the resolution of an image on the other hand.

SUMMARY OF THE INVENTION

It is an object of the present invention to eliminate the disadvantages of conventional techniques while providing an image processing apparatus capable of eliminating random noise contained in image signals.

It is another object of the present invention to provide an image processing apparatus capable of effectively eliminating noise by filtering signals only at an image area which is greatly influenced by noise, without lowering image resolution.

It is a further object of the present invention to provide an image processing apparatus capable of eliminating noise contained in image signals and improving image resolution by performing an edge emphasis process of an area where a noise eliminating process is not applied.

It is a still further object of the present invention to provide an image processing apparatus capable of improving image resolution and effectively suppressing noise components superposed upon a line sensor by adding a small number of circuits.

DETAILED DESCRIPTION OF THE PREFERRED EMBODIMENTS (First Embodiment)

Figure 1:
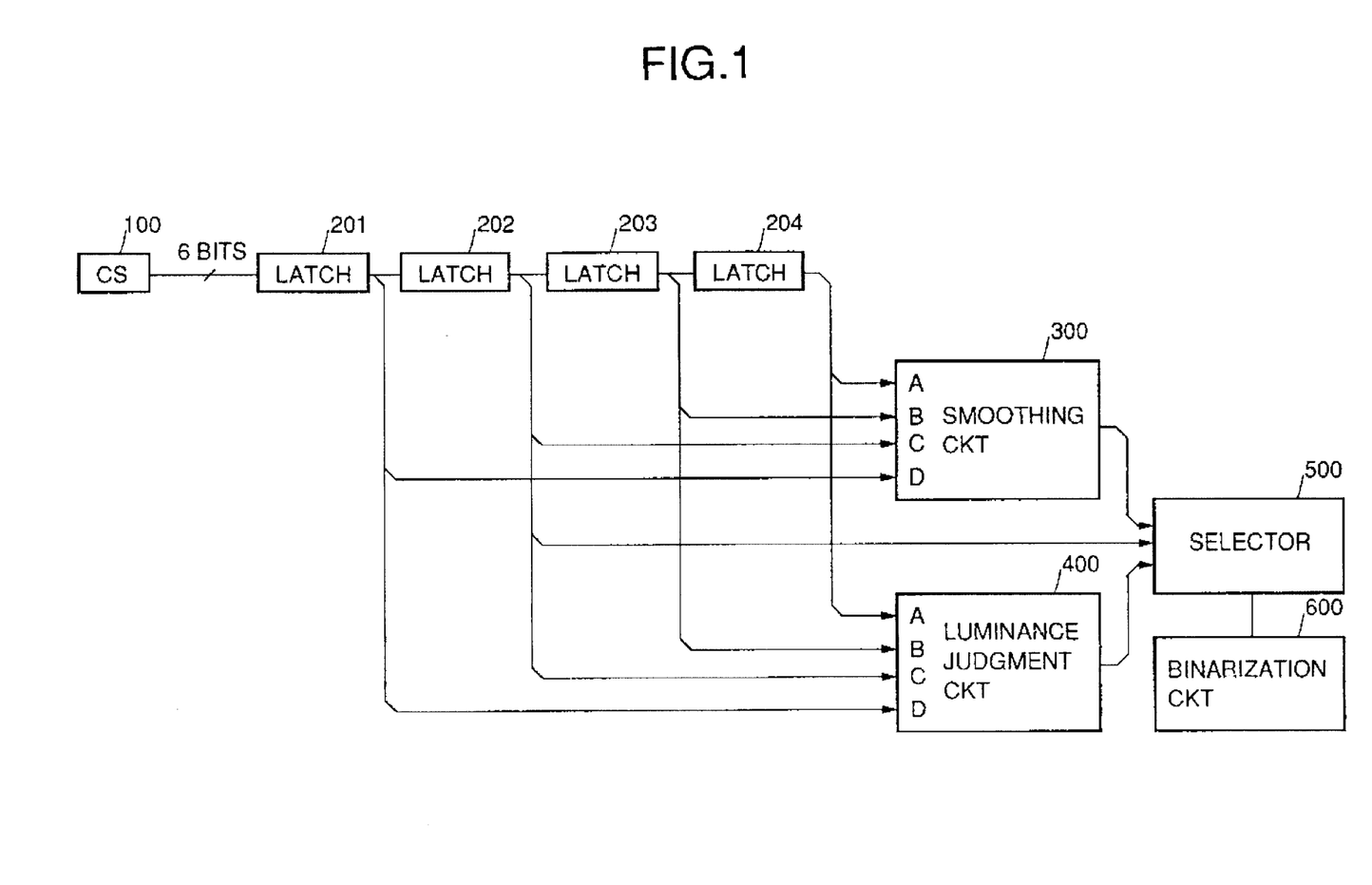
FIG. 1 is a block diagram showing the structure of an image processing apparatus according to a first embodiment of the present invention.

FIG. 1 is a block diagram showing an image processing apparatus according to the first embodiment of the present invention.

A contact sensor (CS) 100 photoelectrically converts an intensity signal of light reflected from an original into electrical signals, and outputs luminance data having six bits per pixel (64 tonal levels).

Latches 201 to 204 constructed of D-type flip-flops receive the luminance data synchronously with pixel clocks, and output luminance data of four pixels in the main scan direction. Representing the luminance data outputted from the latch 202 as a subject pixel, outputted are the luminance data for the subject pixel, and the luminance data for preceding two pixels, and the luminance data for one succeeding pixel.

Figure 3:
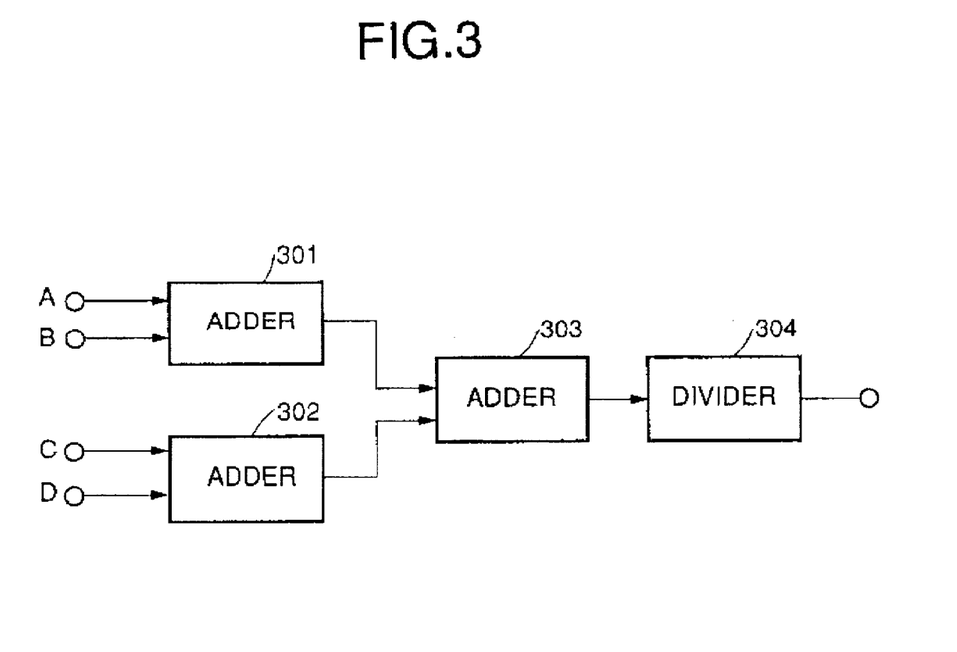
FIG. 3 is a block diagram showing the structure of a smoothing circuit of the first embodiment.

As shown in FIG. 3, a smoothing circuit 300 is constructed of adders 301 to 303 and a divider 304. The smoothing circuit 300 calculates a mean value of the luminance data for the four pixels in the main scan direction outputted from the latches 201 to 204, and outputs the mean value to a selector 500. Namely, the adders 301 to 303 add together the data for the four pixels, and the divider 304 shifts the added data by two bits, i.e., the added data is divided by 4 to obtain a mean value.

Figure 4:
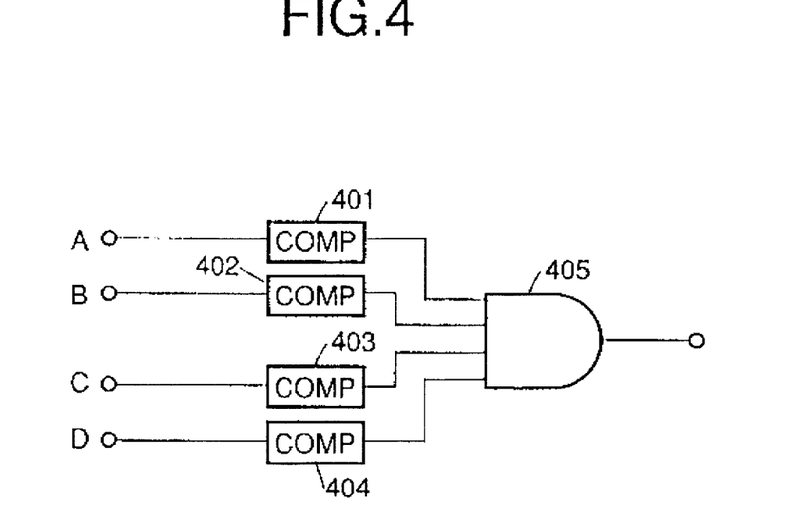
FIG. 4 is a block diagram showing the structure of a luminance judgment circuit of the first embodiment.

The luminance judgment circuit 4 shown in FIG. 1 is constructed of comparators 401 to 404 and an AND gate 405 as shown in FIG. 4. If the four luminance data outputted from the latches 201 to 204 are all less than a reference value set in the comparators 401 to 404, a level "1" signal (truth) is outputted. In all other cases, a level "0" signal (false) is outputted.

A selector 500 shown in FIG. 1 selects smoothed data from the smoothing circuit 300 if the luminance judgment circuit 400 outputs the level "1" signal, and selects the data (subject pixel data) from the latch 202 if the circuit 400 outputs the level "0" signal. The data selected by the selector 500 is outputted to a binarization circuit 600. Namely, if all the values of the luminance data for the subject pixel and peripheral three pixels are less than a predetermined value, the smoothed data is selected.

The binarization circuit 600 performs the luminance-density conversion shown in FIG. 2 for the data selected by the selector 500, and thereafter performs a pseudo half-tone process, such as an error distribution method, to output binarized image data.

Figure 8:
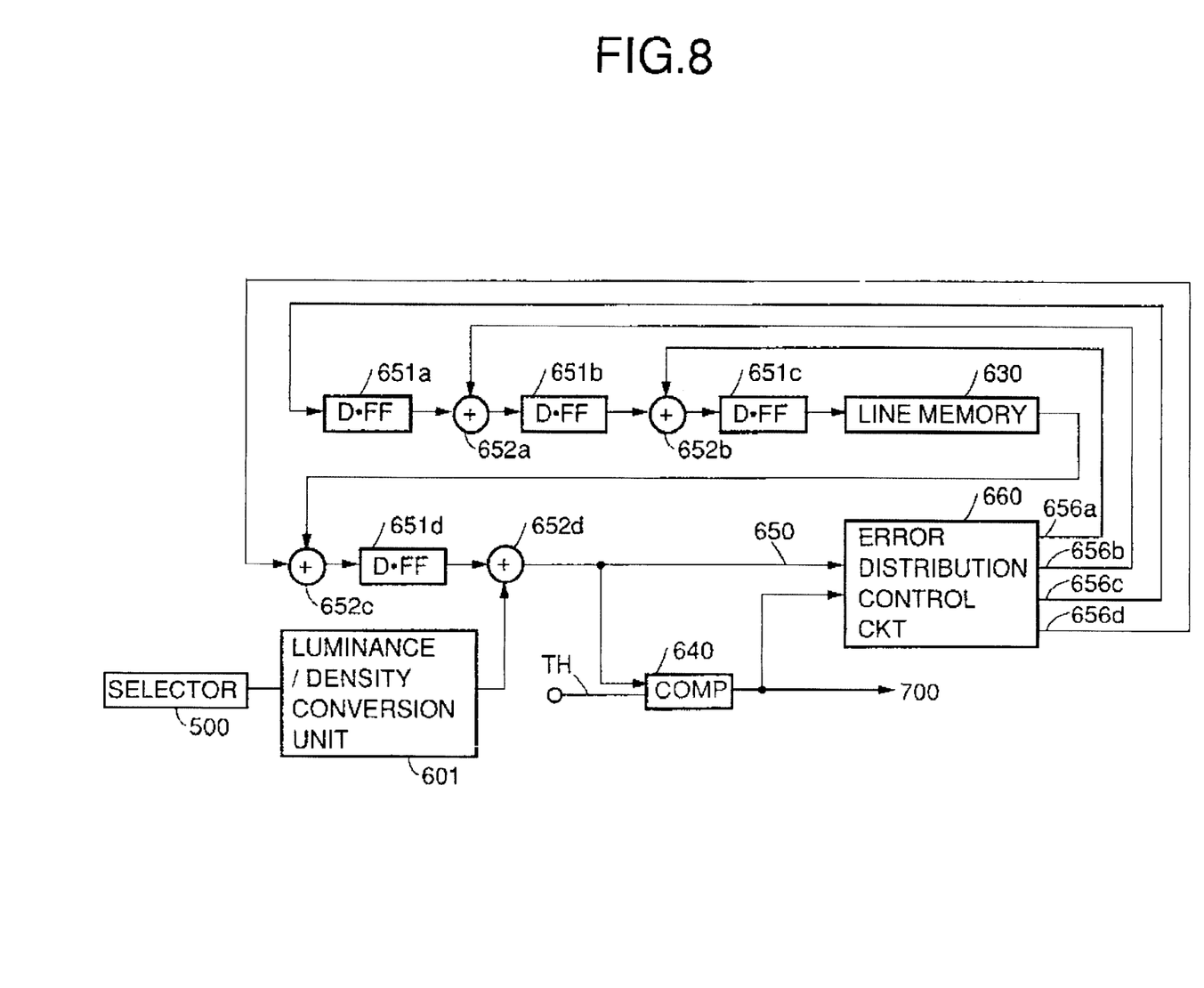
FIG. 8 is a block diagram showing the details of a binarization circuit.

FIG. 8 is an exemplary structure of the binarization circuit shown in FIG. 1. In the binarization circuit 600, a luminance-density conversion unit 601 constructed of a ROM converts the luminance data into density data which is further converted into binarized data. Binarization may use a dither method, an averaged error minimizing method, and the like. In this embodiment, an error distribution method is used which binarizes density data by distributing binarization errors to peripheral pixels to obtain a variable magnification image having a good density conservation.

The details of the binarization circuit 600 using an error distribution process is described with reference to FIG. 8.

In FIG. 8, 651a to 651d represent D-type flip-flops for latching data, 652a to 652d represent adders, 630 represents a line memory for one line delay, 640 represents a comparator, and 660 represents an error distribution control circuit.

In the binarization circuit 600, image data of a multi-value (0 to 63) density outputted from the luminance-density conversion unit 601 is inputted to an adder 652d. The inputted multi-value density data (original image multi-value data corresponding to subject pixel position (i, j)) is added by an adder 652a to the total error distributed to the pixel position, and the added value is outputted via a signal line 650 to the comparator 640 and error distribution control circuit 660. The comparator 640 compares the data on the signal line 650 with a predetermined threshold value TH (e.g., 32 for 6-bit data). If the data on the signal line 650 is larger than the threshold value TH, a level "1" signal (black) is outputted to a signal line 700, and if smaller, a level "0" signal (white) is outputted to the signal line 700.

If the output of the comparator 640 is "0" (white), the error distribution control circuit 660 outputs the data on the signal line 650. If the comparator 640 outputs "1" (black), the error distribution control circuit 660 calculates error quantities 656a to 656d distributed to the peripheral pixels using as an error a difference between the data on the signal line 650 and a constant T (63 for 6-bit data). The error quantity signals 656a to 656d are added by the adders 652a to 652d to the error quantities already distributed to the peripheral pixels (i−1, j+1), (i, j+1), (i+1, j+1), and (i+1, j), respectively of the subject pixel (i, j). The four peripheral pixels of the subject pixel are used in this embodiment. The number of pixels is not so limited, and may be increased or decreased as desired.

Next, the noise eliminating function of the image processing apparatus constructed as above will be described.

Figure 5:
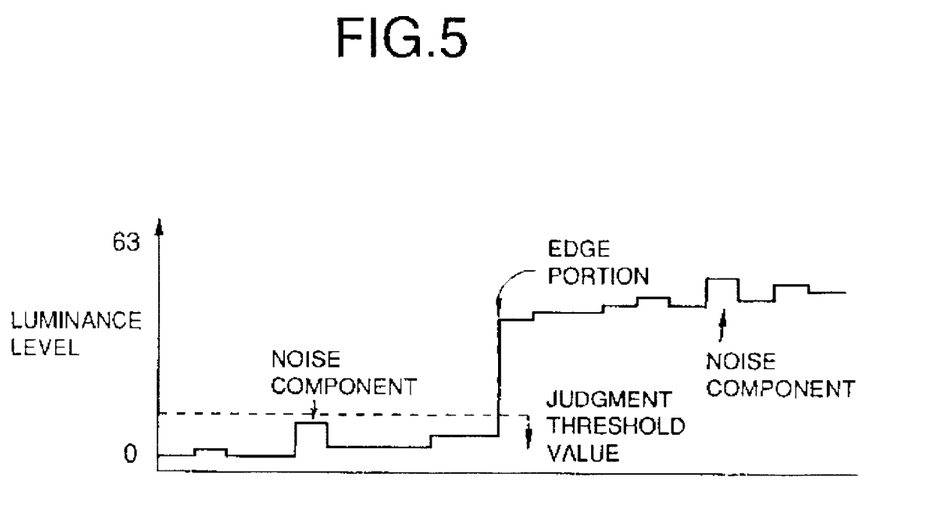
FIG. 5 is a graph showing an example of luminance data to be processed by the first embodiment apparatus.

A low luminance level, where a change in luminance level by one bit is luminance-density converted into M bits change in density level, is greatly influenced by external noise contained in the luminance signal. For example, the luminance signal shown in FIG. 5 is luminance-density converted into the density signal shown in FIG. 6. As shown, noise at a lower luminance level influence the density level more than noise at a higher luminance level.

Figure 6:
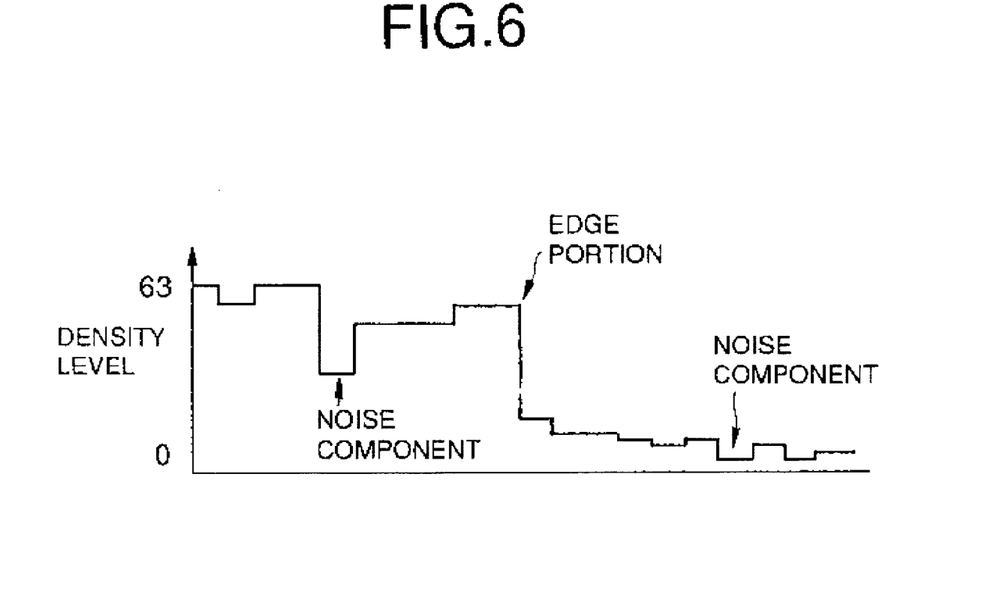
FIG. 6 is a graph showing density data obtained through luminance-density conversion of luminance data shown in FIG. 5.

Noise at a higher luminance level are suppressed after luminance-density conversion as shown in FIG. 6.

Accordingly, if a noise elimination filter is used only for a lower luminance level, it is possible to sufficiently eliminate external noises.

Figure 7:
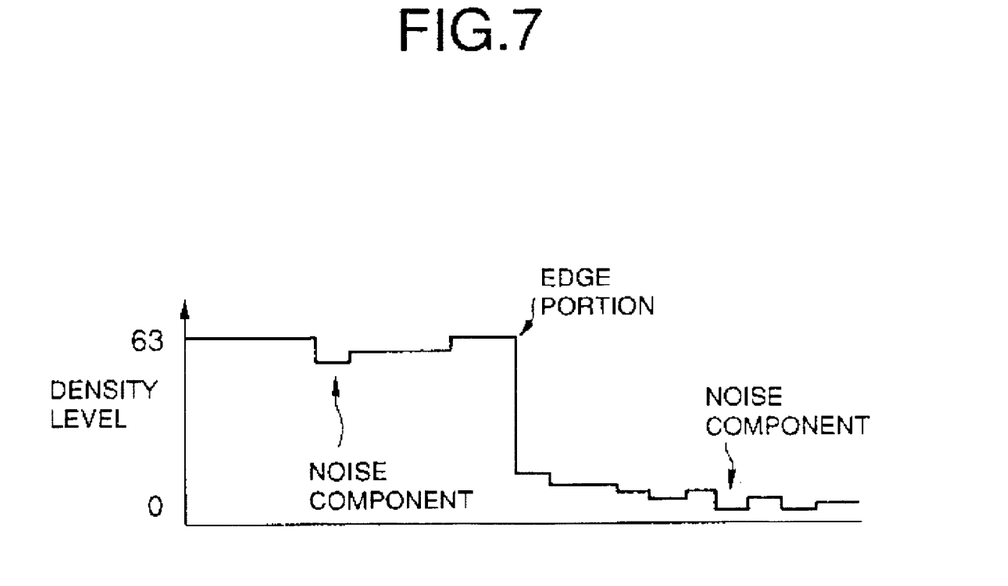
FIG. 7 is a graph showing density data obtained through luminance-density conversion of luminance data shown in FIG. 5 subject to a filtering process of the first embodiment.

Eliminating noise only at a lower luminance level results in use of a noise eliminating filter only for a small image data distribution area. Therefore, as shown in FIG. 7, the edge portion is not degraded or influenced by averaging or noise elimination.

As described above, a combination of a noise elimination filter and a luminance judgment circuit allows noise elimination without deteriorating an image resolution.

In the above embodiment, with a noise eliminating filter, a mean value of four peripheral pixels is calculated. In this noise elimination, a mean value of npixels in the main and sub scan directions may be used. Furthermore, a weighted filter such as a triangle filter may be used considering expected noise frequency components. A median filter for outputting a median value of reference pixel values may also be used in noise elimination.

In the above embodiment, a noise eliminating filter operates when all reference pixel levels are lower than a predetermined luminance level, while considering a luminance-density conversion table. Instead, a noise eliminating filter may be used for a desired area in accordance with the characteristics of a conversion table.

According to the first embodiment of the present invention, a filter is used only for an image area greatly influenced by noise. Therefore, noise can be effectively eliminated without deteriorating an image resolution. (Second Embodiment)

Next, the second embodiment will be described. In addition to the function of the first embodiment, the second embodiment eliminates noise while performing an edge emphasis process for an area not using a noise eliminating filter, to thereby improve an image resolution.

Figure 9:
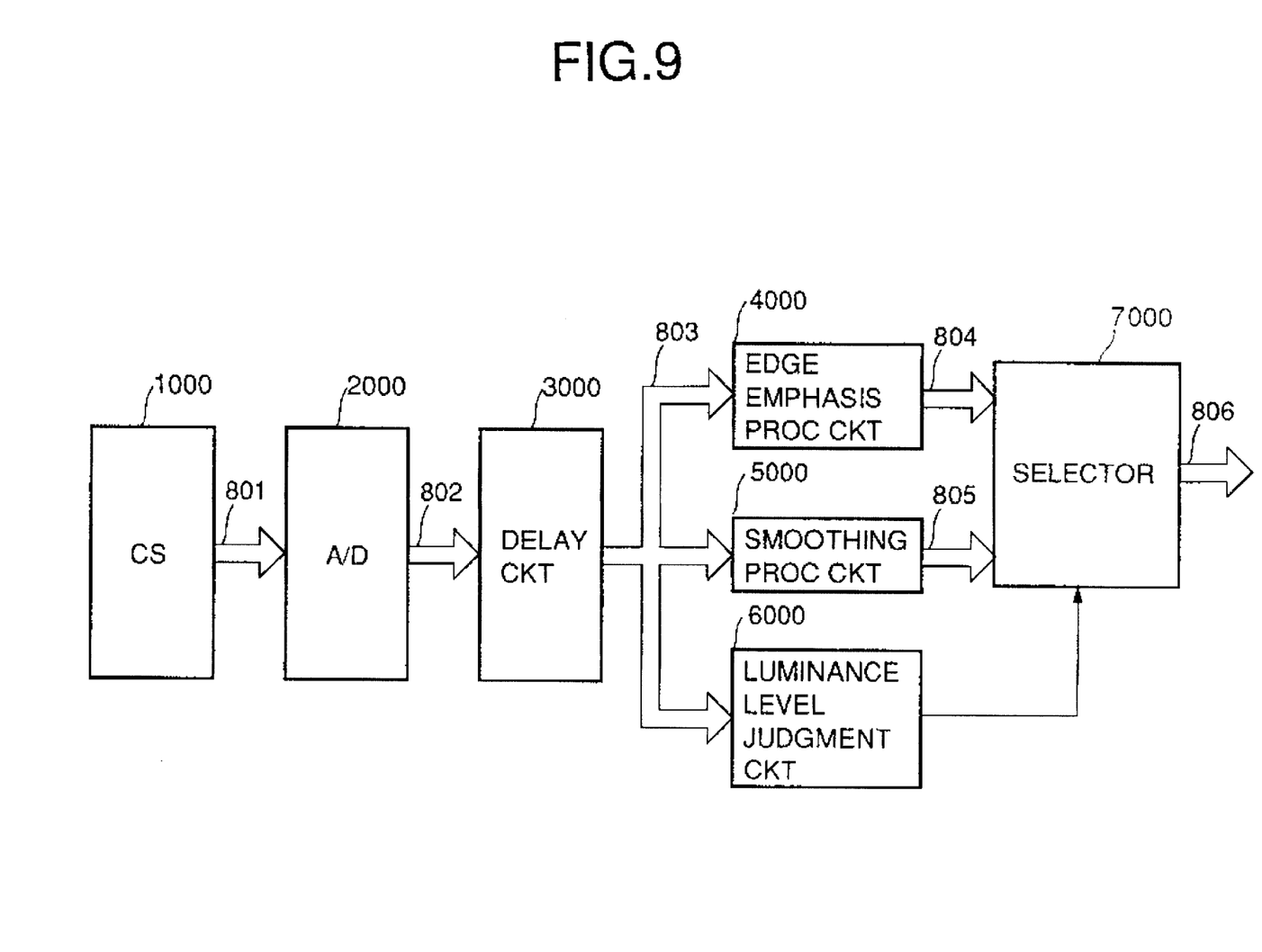
FIG. 9 is a block diagram showing an image processing apparatus according to a second embodiment.

FIG. 9 is a block diagram showing the main part of an image processing apparatus according to the second embodiment of the present invention.

Figure 11A:
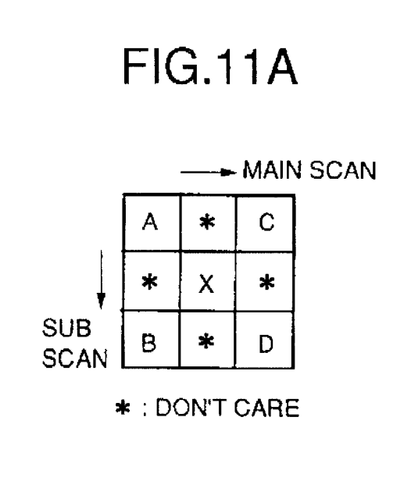
FIG. 11A is a diagram explaining the positions of pixels to be processed.

A contact sensor (CS) 1000 photoelectrically converts an intensity signal (luminance signal) of light reflected from an original into electrical signals. The sensor is not limited only to CS, but a line sensor of CCDs using optical reduction may also be used. An A/D converter 2000 converts an analog signal corrected by a shading correction circuit (not shown) and the like into a digital luminance signal of six bits per pixel. A delay circuit 3000 is constructed of two FIFOs, for a two-line delay, and five D-type flip-flops. Image data of two lines is delayed by the FIFOs to obtain image data of three lines at a time. The image data of three lines is inputted to the D-type flip-flops to delay the image data in the main scan direction. The D-type flip-flops obtain matrix image data A, B, C, D, and X as shown in FIG. 11A which is then outputted to a calculation circuit in the following stage.

Figure 11B:
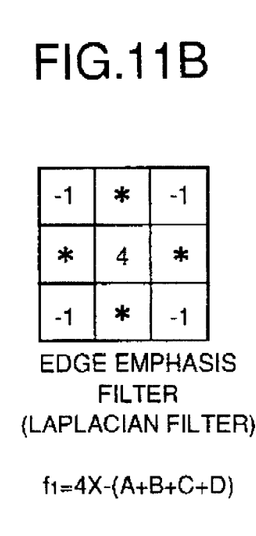
FIG. 11B is a diagram explaining an edge emphasis process.
Figure 11C:
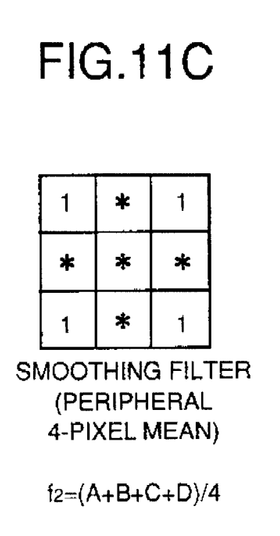
FIG. 11C is a diagram explaining a smoothing process.

A pixel X is used as a subject pixel to output a corrected value for X. A symbol "*" means "don't care" and is not used for calculation. An edge emphasis process circuit 4000 performs an edge emphasis filter (Laplacian filter) calculation process shown in FIG. 11B for the matrix pixel data A, B, C, D, and X supplied from the delay circuit 3000, and outputs resolution-compensated pixel data to a selector 7000. An edge emphasis filter calculation may use optional Laplacian filter values. A smoothing process circuit 3000 smoothes, as shown in FIG. 11C, the matrix pixel data A, B, C, and D outputted from the delay circuit 3000 through calculation of a mean value thereof by using mean value calculating means, and outputs the smoothed pixel data (mean value of A, B, C, and D) to the selector 7000. Instead of the mean value, a median value of A, B, C, and D may be used for a smoothing filter.

Figure 11D:
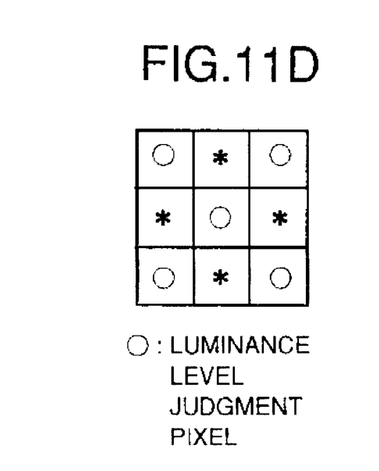
FIG. 11D is a diagram explaining luminance level judgment.

A luminance level judgment circuit 6000 outputs a level H (truth) signal when all of the luminance values of the matrix pixel data A, B, C, D and X, shown in FIG. 11D and obtained from the delay circuit 3000, are within a predetermined range, and in the other case outputs a level L (false) signal. In this embodiment, if the luminance value is equal to or higher than a present luminance value, a level H signal is outputted. The predetermined range is set as desired. The selector 7000 selects the image data from the smoothing process circuit 5000 when the level H signal is outputted from the luminance level judgment circuit 6000, and selects the image data from the edge emphasis process circuit 4000 when a level L signal is outputted.

The image data from the selector 7000 with noise eliminated is converted into density data by LOG conversion as described with reference to FIG. 8 of the first embodiment. The density data is subject to a pseudo half-tone process such as an error distribution method, and is printed out from a binary value printer. For a multi-value printer, the density data is subject to area modulation or the like for printing.

Figure 10:
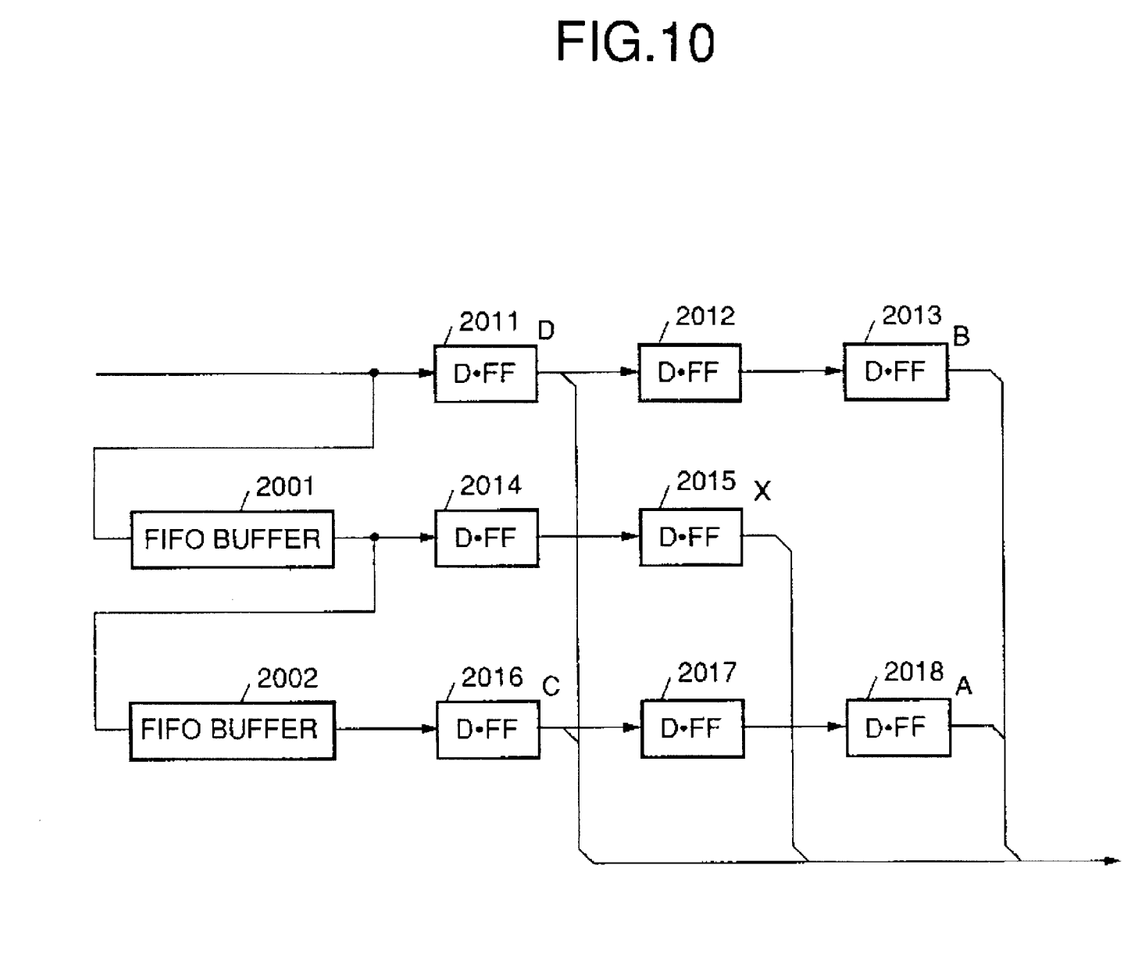
FIG. 10 is a block diagram explaining the details of a delay circuit 3000 shown in FIG. 9.

FIG. 10 shows the details of the delay circuit 3000. FIFO line buffers 2001 and 2002 delay the image data inputted from the A/D converter in the sub scan direction in units of one line. One line is delayed by the FIFO line buffer 2001, and two lines are delayed by the FIFO line buffers 2001 and 2002. D-type flip-flops 2011 to 2018 delay the image data line-delayed by the FIFOs in the main scan direction in units of one pixel, to thereby obtain the five matrix pixel data A, B, C, D, and X. Characters shown at the upper right-hand corners of the D-type flip-flops (D-FF) of FIG. 10 correspond to the pixel positions shown in FIG. 11A.

Figure 12:
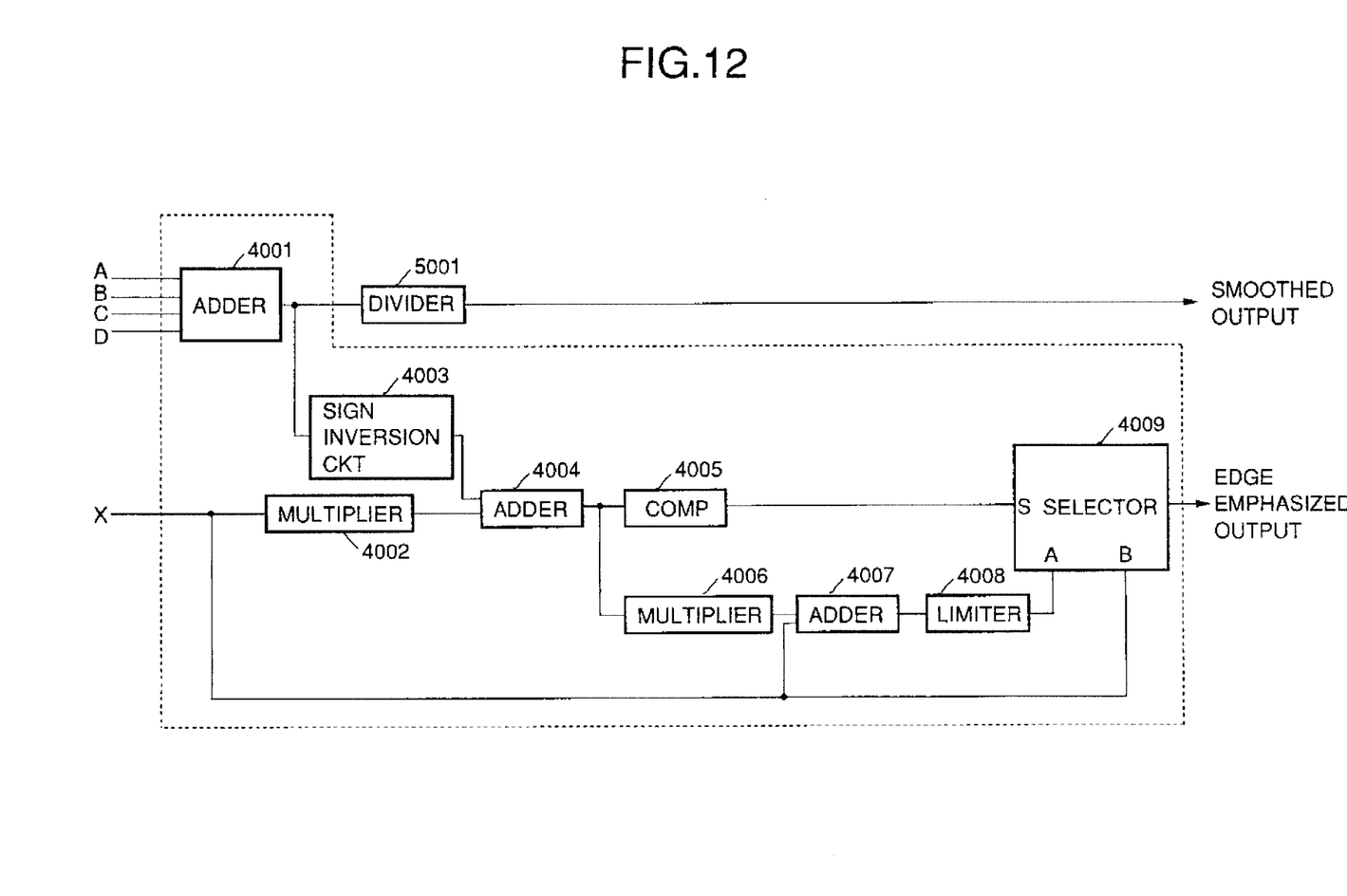
FIG. 12 is a block diagram explaining the details of a smoothing circuit and an edge emphasis circuit.

FIG. 12 shows the details of the edge emphasis process circuit and smoothing circuit 4000. An adder 4001 adds together the luminance signals for the peripheral pixels A, B, C, and D of the subject pixel. An output of the adder is used for both of the smoothing process and edge emphasis process. A divider 5001 divides an output of the adder 4001 by 4 to obtain a mean value of the luminance signals. This division can be achieved by simply shifting the output of the adder by two bits.

A multiplier 4002 multiplies the luminance signal for the subject pixel by 4. This multiplication can be achieved by shifting the luminance signal by two bits, similar to the case of the divider 5001.

A sign inversion circuit 4003 inverts the sign of an output from the adder 4001 for a later subtraction. An adder 4004 adds together the outputs of the sign inversion circuit 4003 and the multiplier 4002. The output of the adder 4004 is a Laplacian filter value. A comparator 4005 determines whether the Laplacian filter value is within a predetermined range. If so, it supplies a selection signal to a selector 4009 to inhibit an addition to the Laplacian value. A multiplier 4006 multiplies the Laplacian value to adjust the gain of the value.

An adder 4007 adds the gain adjusted Laplacian value to the subject pixel value X. A limiter 4008 limits the data after addition of the Laplacian value to a minimum or maximum pixel value if the data is beyond the minimum or maximum pixel value. The selector 4009 selects the subject pixel value X if an output of the comparator 4005 indicates that the Laplacian value is within the predetermined range. In the other case, it selects the value after filtering. An output value of the selector 4009 becomes pixel data after the edge emphasis process. The block enclosed by a broken line in FIG. 12 is a conventional edge emphasis circuit. In this embodiment, only the divider 5001 is added to provide the smoothing process.

The advantageous effects of each block of the image processing apparatus will be described in detail. As shown in FIG. 2, a low luminance level area is greatly influenced by external noise contained in a luminance signal at the time of LOG conversion (luminance-density conversion), a change in luminance level by one bit results in a change in density level by n bits. Therefore, the smoothing filter is used only at the lower luminance level area to eliminate noise effects. On the other hand, noises at a higher luminance level have a tendency to be suppressed after LOG conversion, because of missing bits. It is therefore possible to effectively eliminate noise by performing the smoothing process only for an area having greater noise effects after LOG conversion (i.e., a smaller luminance level area). Furthermore, since noise is eliminated only at the smaller luminance level area, the smoothing filter is used only for the area having a small distribution of image data. The area including edge portions of an image generally has a large data distribution. Accordingly, the smoothing process is not performed for this area. This can be easily achieved by limiting the luminance level of pixels.

As described above, a combination of a smoothing filter and a luminance judgment circuit allows noise elimination without deteriorating image resolution.

In the above embodiment, a mean value of the matrix pixel data A, B, C, and D is calculated using the smoothing filter as shown in FIG. 11C. Therefore, it is possible to simplify the circuit by sharing the addition of A, B, C, and D with the calculation of 4X−(A+B+C+D) by the edge emphasis filter as shown in FIG. 11B. It is therefore unnecessary to utilize an extra adder for the smoothing process. The noise eliminating circuit of this embodiment can be realized by adding only a comparator for the luminance level judging circuit 6000 and the selector 7000, to a conventional edge emphasis circuit.

In the above embodiment, the edge emphasis calculation and smoothing calculation have been performed using the peripheral pixels at the upper and lower, right and left positions of the subject pixel. An edge emphasis calculation may use peripheral pixels at right, left, upper, and lower positions of the subject pixel, and a smoothing calculation may use a mean value of the subject pixel and right and left peripheral pixels in the main scan direction. Furthermore, although the embodiment uses a 3×3 matrix, other types of matrices may also be used.

As described thus far, according to the second embodiment of the present invention, noise components superposed on a line sensor can be effectively suppressed with a small number of added circuits, while minimizing the deterioration of image resolution.

What is claimed is:

1. An image processing apparatus comprising:

input means for inputting image data;

smoothing process means for smoothing image data of a subject pixel, in accordance with the image data of the subject pixel and peripheral pixels of the subject pixel, respectively input by said input means;

edge emphasis process means for edge-emphasizing the image data of the subject pixel input by said input means;

judgment means for judging a level of the image data of the subject pixel and the peripheral pixels; and output control means for selectively outputting one of the image data smoothed by said smoothing process means and the image data edge-emphasized by said edge emphasis process means, in accordance with a judgment result of said judgment means, wherein said input means inputs luminance data, and said judgment means judges whether or not levels of the input luminance data of the subject pixel and the peripheral pixels are within a predetermined level, and said output control means outputs the smoothed image data when said judgment means judges that the luminance data of the subject pixel and the peripheral pixels is within the predetermined level without any other processing of the input luminance data, and outputs the edge-emphasized image data when said judgement means judges that the luminance data of the subject pixel and the peripheral pixels is not within the predetermined level without any other processing of the input luminance data.

2. An apparatus according to claim 1, wherein said output control means outputs luminance data of said subject pixel from one of said smoothing process means and said edge emphasis process means.

3. An apparatus according to claim 2, further comprising conversion means for converting said luminance data from said output control means into density data.

4. An apparatus according to claim 3, further comprising binarization means for binarizing said density data from said conversion means by an error distribution method.

5. An apparatus according to claim 1, wherein said smoothing process means outputs a mean value of the image data of said subject pixel and said peripheral pixels.

6. An image processing method comprising the steps of:

inputting image data;

smoothing image data of a subject pixel, in accordance with the image data of the subject pixel and peripheral pixels of the subject pixel, respectively input in said inputting step;

edge-emphasizing the image data of the subject pixel input in said inputting step;

judging a level of the image data of the subject pixel and the peripheral pixels; and selectively outputting one of the image data smoothed in said smoothing step and the image data edge-emphasized in said edge-emphasizing step, in accordance with a judgment result obtained in said judging step, wherein, in said inputting step, luminance data is input and in said judging step, judgment is made as to whether or not the level of the input luminance data of the subject pixel and the peripheral pixels are within the predetermined range, and in said selectively outputting step, the smoothed image data is output when in said judging step the judgment is made that the luminance data of the subject pixel and the peripheral pixels is within the predetermined range without any other processing of the input luminance data, and the image data of the subject pixel is output when in said judging step the judgment is made that the luminance data of the subject pixel and the peripheral pixels is not within the predetermined range without any other processing of the input luminance data.

7. A method according to claim 6, wherein in said selectively outputting step, the luminance data of the subject pixel obtained at one of said smoothing step and said edge-emphasizing step is output.

8. A method according to claim 7, further comprising the step of converting the luminance data obtained in said selectively outputting step into density data.

9. A method according to claim 8, further comprising a step of binarizing the density data obtained in said converting step by an error distribution method.

10. A method according to claim 6, wherein said smoothing step outputs a mean value of the image data of the subject pixel and the peripheral pixels.

\* \* \* \* \*

UNITED STATES PATENT AND TRADEMARK OFFICE
CERTIFICATE OF CORRECTION

PATENT NO. : 5,539,541
DATED : July 23, 1996
INVENTOR(S) : KATSUTOSHI USHIDA

It is certified that error appears in the above-indentified patent and that said Letters Patent is hereby corrected as shown below:

COLUMN 4

```
Line 1,   "influence" should read --influences--;
Line 3,   "are" should read --is--;
Line 7,   "noises." should read --noise.--;
Line 18,  "npixels" should read --n pixels--;
Line 34,  "(Second" should read --¶ (Second--.
```

Signed and Sealed this

Tenth Day of December, 1996

Attest:

BRUCE LEHMAN

Attesting Officer    Commissioner of Patents and Trademarks